United States Patent [19]
Chiba et al.

[11] Patent Number: 5,935,237
[45] Date of Patent: Aug. 10, 1999

[54] MICROPROCESSOR CAPABLE OF CARRYING OUT DIFFERENT DATA LENGTH INSTRUCTIONS

[75] Inventors: Masakazu Chiba; Mitsurou Ohuchi, both of Tokyo, Japan

[73] Assignee: NEC Corporation, Tokyo, Japan

[21] Appl. No.: 08/866,125

[22] Filed: May 30, 1997

[51] Int. Cl.$^6$ ..................................... G06F 7/20
[52] U.S. Cl. ................ 712/42; 713/324; 713/107; 712/43
[58] Field of Search .................. 711/220, 214, 711/202; 395/800.42, 750.03, 750.06, 750.01, 113; 364/707; 713/127, 320, 324, 300; 712/42; 708/277, 321

[56] References Cited

U.S. PATENT DOCUMENTS 5,666,510  9/1997  Mitsuishi et al. .................. 711/220

FOREIGN PATENT DOCUMENTS 4-211837  8/1992  Japan .

*Primary Examiner*—Larry D. Donaghue
*Attorney, Agent, or Firm*—Sughrue, Mion, Zinn, Macpeak & Seas, PLLC

[57] ABSTRACT

In a microprocessor capable of carrying out instructions having different data lengths including an instruction decoder, a register, an operational circuit and a control circuit for controlling the register and the operational unit, the register is divided into a plurality of register units, and the operational circuit is divided into a plurality of operational circuits units, each of which is connected to one of the register units. The control circuit selectively operates the register units and the operation circuit units in accordance with outputs of the instruction decoder.

2 Claims, 6 Drawing Sheets

Fig. 5

| DATA LENGTH | SIZE | REGA | REGB | REGC | OPA | OPB | OPC |
|---|---|---|---|---|---|---|---|
| 8 BITS | 00 | OFF | OFF | ON | OFF | OFF | ON |
| 16 BITS | 01 | OFF | ON | ON | OFF | ON | ON |
| 32 BITS | 11 | ON | ON | ON | ON | ON | ON |

Fig. 6

| DATA LENGTH | SIZE | REGA | REGB | REGC | OPA | OPB | OPC |
|---|---|---|---|---|---|---|---|
| 8 BITS | 00 | OFF | OFF | ON | OFF | OFF | OFF |
| 16 BITS | 01 | OFF | ON | ON | OFF | OFF | OFF |
| 32 BITS | 11 | ON | ON | ON | OFF | OFF | OFF |

MICROPROCESSOR CAPABLE OF CARRYING OUT DIFFERENT DATA LENGTH INSTRUCTIONS

BACKGROUND OF THE INVENTION

1. Field of the Invention

The present invention relates to a microprocessor capable of carrying out instructions having different data lengths.

2. Description of the Related Art

Generally, a microcomputer is constructed by a central processing unit (CPU), a memory and an input/output interface. Also, the CPU, called a microprocessor, is formed by an instruction decoder, registers, operational circuits such as an arithmetic and logic unit (ALU) and shifters.

As semiconductor technology has been developed, the data length of microprocessors has been increased from 4 bits via 8 bits, 16 bits and 32 bits to 64 bits. Note that, generally, as the data length has been increased, the power dissipation of microprocessors has also been increased.

On the other hand, microprocessors have been introduced into portable electronic apparatuses powered by batteries, and as a result, the reduction of power dissipation is required.

In a prior art 32-bit microprocessor capable of carrying out an 8-bit data length instruction, a 16-bit data length instruction and a 32-bit data length instruction, 32-bit registers and 32-bit operational circuits are always operated. As a result, it is impossible to reduce the power dissipation. This will be explained later in detail.

Similarly, in a prior art 64-bit microprocessor capable of carrying out an 8-bit data length instruction, a 16-bit data length instruction, a 32-bit data length instruction and a 64-bit data length instruction, 64-bit registers and 64-bit operational circuits are always operated. As a result, it is also impossible to reduce the power dissipation.

SUMMARY OF THE INVENTION

It is an object of the present invention to reduce the power dissipation of a microprocessor capable of carrying out instructions having different data lengths.

According to the present invention, in a microprocessor capable of carrying out instructions having different data lengths including an instruction decoder, a register, an operational circuit and a control circuit for controlling the register and the operational unit, the register is divided into a plurality of register units, and the operational circuit is divided into a plurality of operational circuits units, each of which is connected to one of the register units. The control circuit selectively operates the register units and the operation circuit units in accordance with outputs of the instruction decoder.

BRIEF DESCRIPTION OF THE DRAWINGS

The present invention will be more clearly understood from the description as set forth below, as compared with the prior art, with reference to the accompanying drawings, wherein:

FIGS. 5 and 6 are tables for showing the operation of the microprocessor of FIG. 2.

DESCRIPTION OF THE PREFERRED EMBODIMENT

Before the description of the preferred embodiment, a prior art microprocessor will be explained with reference to FIG. 1.

Figure 1:
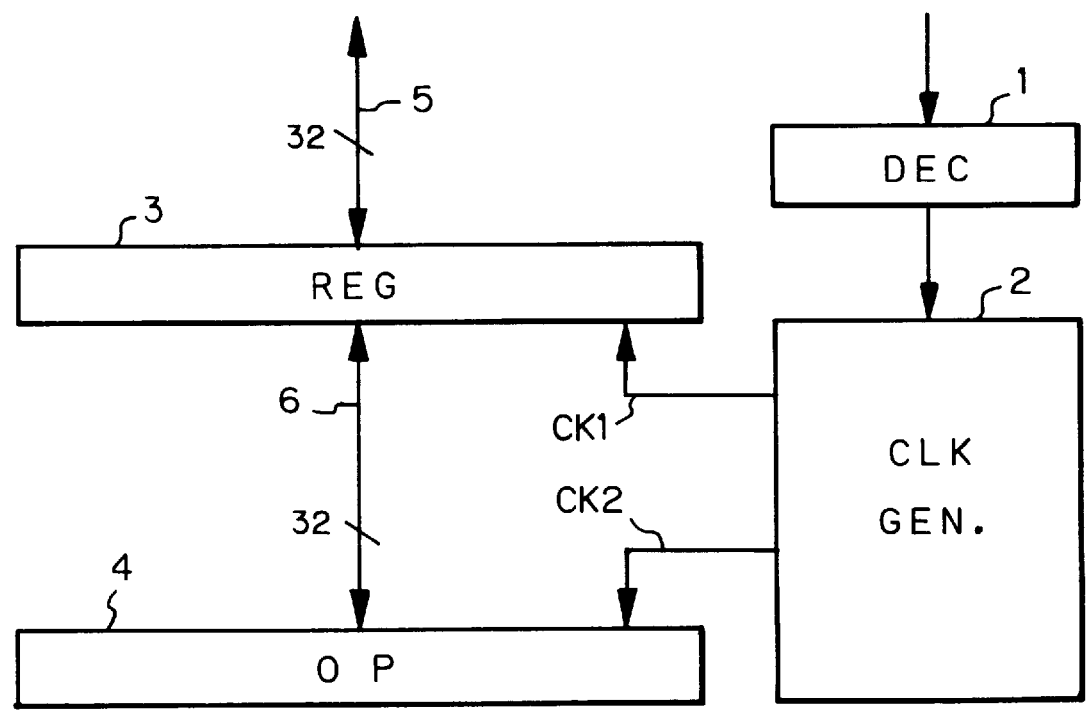
FIG. 1 is a circuit diagram illustrating a prior art 32-bit microprocessor.

In FIG. 1, a 32-bit microprocessor capable of processing 8-bit data, 16-bit data and 32-bit data is illustrated. An instruction decoder 1 receives and decodes an instruction code from an instruction memory (not shown) to transmit instruction information to a clock signal generator 2 which supplies clock signals CLK1 and CLK2 to a 32-bit register 3 and a 32-bit operational circuit 4 including an ALU and shifters. The register 3 is connected via a 32-bit bus 5 to a system interface (not shown), and the operational circuit 6 is connected via a 32-bit bus 6 to the register 3.

In the microprocessor of FIG. 1, however, since the full 32-bit register 3 and the full 32-bit operational circuit 4 are operated regardless of predetermined data length of executed instructions, the power dissipation is fixed. Therefore, when waste data is passed, it is impossible to reduce the power dissipation.

Figure 2:
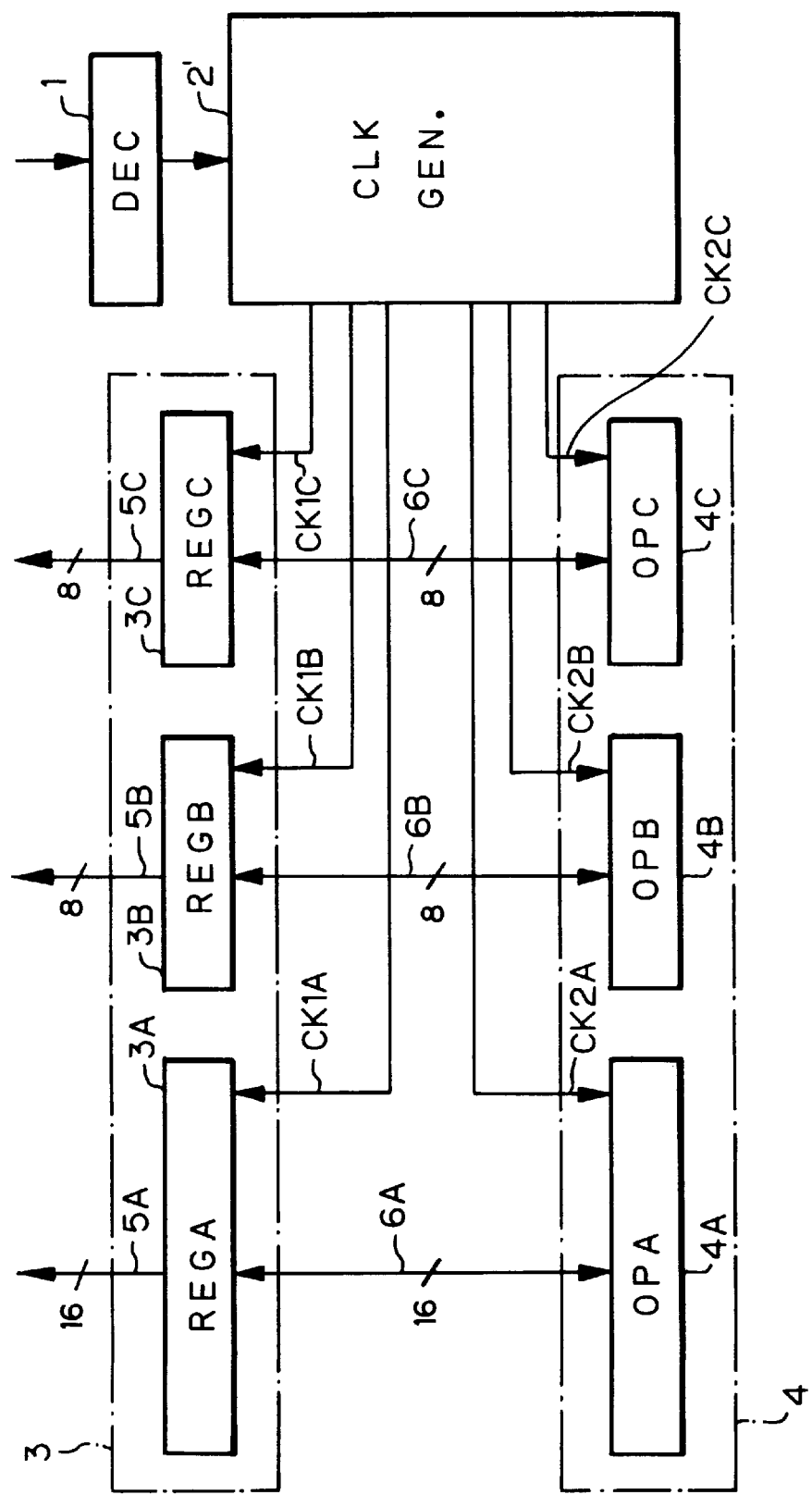
FIG. 2 is a circuit diagram illustrating an embodiment of the 32-bit microprocessor according to the present invention.

In FIG. 2, which illustrates an embodiment of the present invention, the 32-bit register 3 of FIG. 1 is divided into a 16-bit register unit 3A, an 8-bit register unit 3B and an 8-bit register unit 3C. Also, the 32-bit operational circuit 4 of FIG. 1 is divided into a 16-bit operational circuit unit 4A, an 8-bit operational circuit unit 4B and an 8-bit operational circuit unit 4C.

In addition, a 16-bit bus 5A, an 8-bit bus 5B and an 8-bit bus 5C are provided instead of the 32-bit bus 5 of FIG. 1. Also, a 16-bit bus 6A, an 8-bit bus 6B and an 8-bit bus 6C are provided instead of the 32-bit bus 6 of FIG. 1.

Further, a clock signal generator 2' is provided instead of the clock signal generator 2 of FIG. 1. The clock signal generator 2' generates clock signals CK1A, CK1B and CK1C for the register units 3A, 3B and 3C, respectively, and clock signals CK2A, CK2B and CK2C for the operational circuit units 4A, 4B and 4C, respectively.

Figure 3:
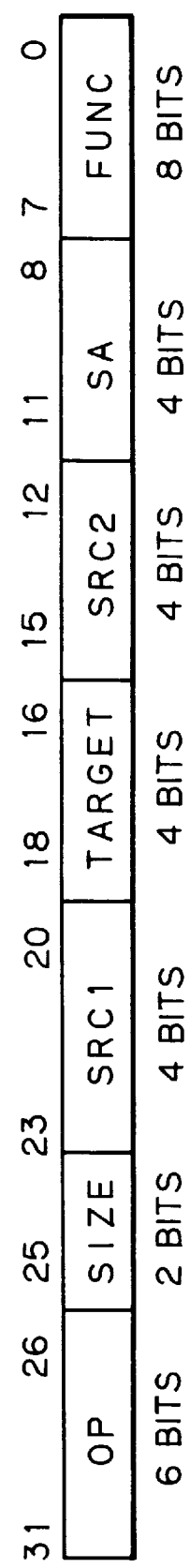
FIG. 3 is a diagram showing an example of an instruction used in the microprocessor of FIG. 2.

In FIG. 3, which illustrates an example of instruction format, a register type instruction format is shown. That is, bits 26 to 31 designate an operation code (OP), bits 24 and 25 designate a data size (SIZE), bits 20 to 23 designate a source register 1 (SRC1), bits 16 to 19 designate a target register (TARGET), bits 12 to 15 designate a source register 2 (SRC2), bits 8 to 11 designate shift-bits of a shift instruction (SA), and bits 0 to 7 designate a sub operation code (extended operation code: FUNC).

Also, SIZE (=00) designates an 8-bit data instruction, SIZE (=01) designates a 16-bit data instruction, and SIZE (=11) designates a 32-bit data instruction.

Figure 4:
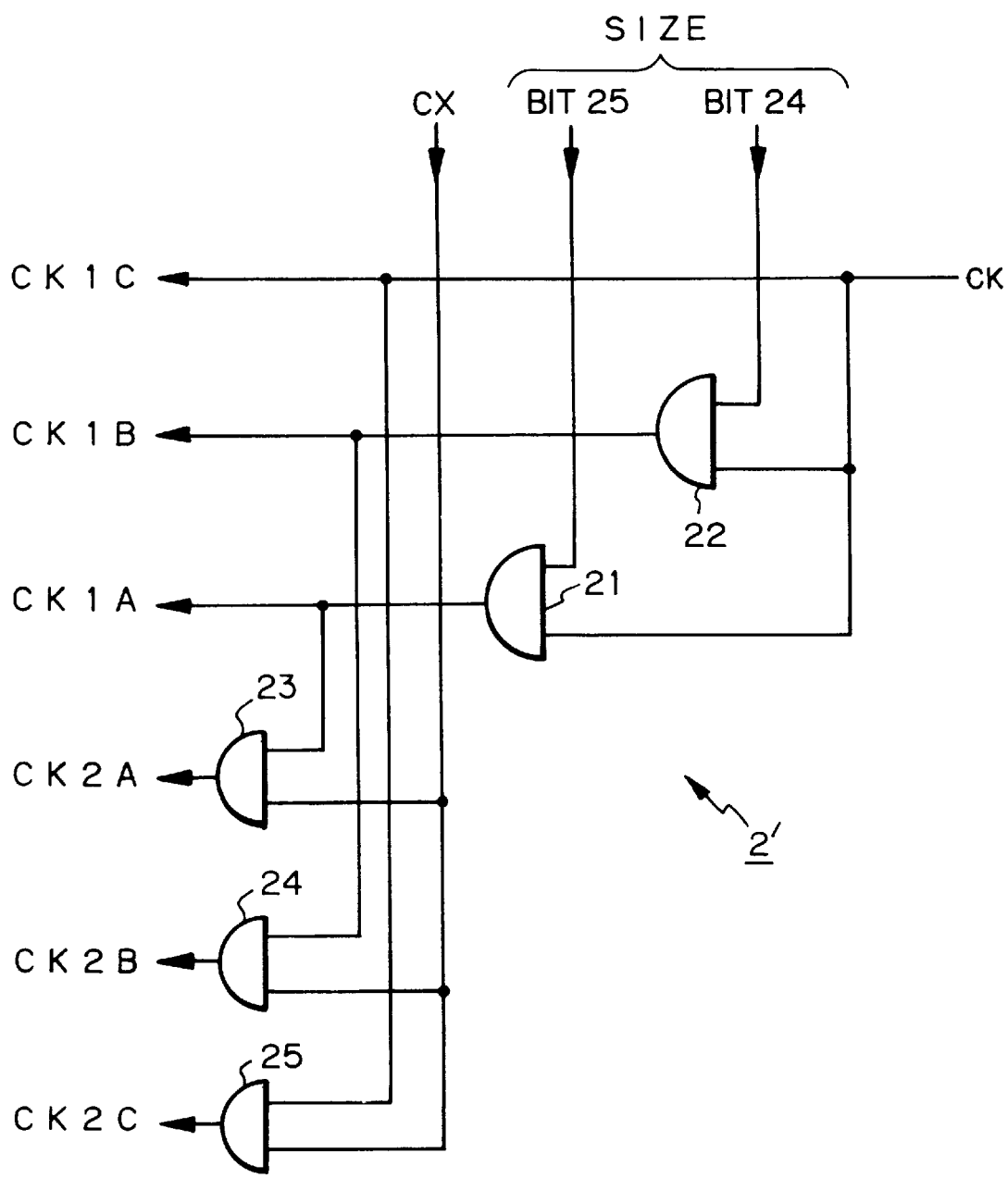
FIG. 4 is a circuit diagram of the clock signal generator of FIG. 2.

As illustrated in FIG. 4, the clock signal generator 2' is formed by five AND circuits 21, 22, 23, 24 and 25. A clock signal CK is supplied as the clock signal CK1A via the AND circuit 21 to the register unit 3A. Also, the clock signal CK is supplied via the AND circuit 22 as the clock signal CK1B to the register unit 3B. Further, the clock signal CK is supplied directly as the clock signal CK1C to the register unit 3C. In this case, the AND circuits 21 and 22 are controlled by the SIZE bits 25 and 24, respectively, of the instruction format.

In addition, the clock signals CK1A, CK1B and CK1C are supplied as the clock signals CK2A, CK2B and CK2C, via the AND circuits 23, 24 and 25 to the operational circuit units 4A, 4B and 4C, respectively. The AND circuits 23, 24 and 25 are controlled by an output bit CX of the instruction decoder 1 the bit CX showing whether the instruction is an arithmetic (or logic) operation instruction or an inter-register data transmission instruction. In the case of an arithmetic (or logic) operation instruction, the bit CX is "1", while in the case of an inter-register data transmission instruction, the bit CX is "0".

The operation of the microprocessor of FIG. 2 is explained next with reference to FIG. 5 where the instruction is an arithmetric instruction (CX="1").

That is, if the data length is 8 bits (SIZE=00), the clock signals CK1C and CK2C are generated from the clock signal generator 2', so that the register unit 3C and the operational circuit unit 4C are operated.

Also, if the data length is 16 bits (SIZE=01), the clock signals CK1B, CK1C, CK2B and CK2C are generated from the clock signal generator 2', so that the register units 3B and 3C and the operational circuit units 4B and 4C are operated.

Further, if the data length is 32 bits (SIZE=11), the clock signals CK1A, CK1B, CK1C, CK2A, CK2B and CK2C are generated from the clock signal generator 2', so that the register units 3A, 3B and 3C and the operational circuit units 4A, 4B and 4C are operated.

The operation of the microprocessor of FIG. 2 is explained next with reference to FIG. 5 where the instruction is an inter-register data transmission instruction (CX="0").

That is, if the data length is 8 bits (SIZE=00), the clock signal CK1C is generated from the clock signal generator 2', so that the register unit 3C is operated.

Also, if the data length is 16 bits (SIZE=01), the clock signals CK1B and CK1C are generated from the clock signal generator 2', so that the register units 3B and 3C are operated.

Further, if the data length is 32 bits (SIZE=11), the clock signals CK1A, CK1B and CK1C are generated from the clock signal generator 2', so that the register units 3A, 3B and 3C are operated.

In the above-mentiond embodiment, the number of register units and the number of operational circuit units can be changed in accordance with possible data length. In this case, the data length of each register is the same as a minimum data length of processing data or a multiple thereof. Also, the present invention can be applied to a 64-bit microprocessor or the like.

As explained hereinabove, according to the present invention, since register units and operational circuit units are selectively operated in accordance with the kind of instruction and data length, the power dissipation can be reduced.

We claim:

1. A microprocessor capable of carrying out instructions having different data lengths comprising:

an instruction decoder;

a register divided into a plurality of register units;

an operational circuit divided into a plurality of operational circuit units each connected to one of said register units;

a control circuit, connected to said instruction decoder, said register and said operational circuit, for selectively operating said register units and said operation circuit units in accordance with outputs of said instruction decoder, wherein said control circuit selectively operates said register units in accordance with data size information generated form said instruction decoder and selectively operates said oeprational circuits in accordance with data size information and kind of operation generated from said instruction decoder, said control circuit selectively operating said register units and said operational units, when said kind of operation is an arithmetic/logic operation instruction, and said control circuit selectively operating only said register units, when said kind of operation is an inter-register operation instruction.

2. The microprocessor of claim 1, wherein the size of each of said register units is equal to a minimum data length of said different data lengths or a multiple of said minimum data length.

* * * * *

UNITED STATES PATENT AND TRADEMARK OFFICE
CERTIFICATE OF CORRECTION

PATENT NO. : 5,935,237
DATED : August 10, 1999
INVENTOR(S) : Masakazu CHIBA and Mitsurou OHUCHI It is certified that error appears in the above-identified patent and that said Letters Patent is hereby corrected as shown below:

Title page     after section [22], insert --[30]   Foreign Application Priority Data
May 30, 1996   [JP]   Japan   8-136698--;

Column 2,    line 65,      delete "3C" and insert --3A--;

Column 3,    line 14,      delete "arithmetric" and insert --arithmetic--;

Column 3,    line 30,      delete "5" and insert --6--;

Column 3,    line 43,      delete "mentiond" and insert --mentioned--;

Column 4,    line 29,      delete "form" and insert --from--;

Column 4,    line 30,      delete "oeprational" and insert --operational--.

Signed and Sealed this

Twelfth Day of September, 2000

Attest:

Q. TODD DICKINSON

*Attesting Officer*            *Director of Patents and Trademarks*